(12) United States Patent
Hsu (10) Patent No.: US 10,409,717 B2
(45) Date of Patent: Sep. 10, 2019

(54) DATA STORAGE DEVICE AND METHOD FOR OPERATING DATA STORAGE DEVICE

(71) Applicant: Silicon Motion, Inc., Jhubei (TW)

(72) Inventor: Sheng-I Hsu, Zhubei (TW)

(73) Assignee: Silicon Motion, Inc., Jhubei (TW)

( * ) Notice: Subject to any disclaimer, the term of this patent is extended or adjusted under 35 U.S.C. 154(b) by 38 days.

(21) Appl. No.: 15/853,210

(22) Filed: Dec. 22, 2017

(65) Prior Publication Data

US 2018/0329816 A1    Nov. 15, 2018

(30) Foreign Application Priority Data

May 11, 2017    (TW) .............................. 106115909 A (51) Int. Cl.
| | |
|---|---|
| G06F 12/00 | (2006.01) |
| G06F 12/02 | (2006.01) |
| G06F 11/10 | (2006.01) |
| G06F 3/06 | (2006.01) |

(52) U.S. Cl.
CPC .......... *G06F 12/0246* (2013.01); *G06F 3/064* (2013.01); *G06F 3/0619* (2013.01); *G06F 3/0631* (2013.01); *G06F 3/0659* (2013.01); *G06F 3/0679* (2013.01); *G06F 11/1004* (2013.01); *G06F 11/1068* (2013.01); *G06F 2212/7201* (2013.01); *G06F 2212/7202* (2013.01); *G06F 2212/7204* (2013.01)

(58) Field of Classification Search
CPC .. G06F 12/0246; G06F 3/0619; G06F 3/0631; G06F 3/064; G06F 3/0659; G06F 3/0679; G06F 11/1004; G06F 11/1068
See application file for complete search history.

(56) References Cited

U.S. PATENT DOCUMENTS

| | | | |
|---|---|---|---|
| 2016/0224588 A1 | 8/2016 | Harijono et al. | |
| 2016/0259583 A1* | 9/2016 | Kasa | .................... G06F 3/0623 |

FOREIGN PATENT DOCUMENTS

| | | |
|---|---|---|
| CN | 106560781 A | 4/2017 |
| TW | 201217968 A | 5/2012 |
| TW | 201337554 A | 9/2013 |
| TW | 201514697 A | 4/2015 |
| TW | 201624491 A | 7/2016 |

* cited by examiner

*Primary Examiner* — Shawn X Gu (74) *Attorney, Agent, or Firm* — Wang Law Firm, Inc.

(57) ABSTRACT

A data storage device includes a flash memory, a data processing module and a flash memory controller. Corresponding to the operation of a host, the flash memory controller arranges the flash memory to store data, and it stores a mapping table to record the mapping information between the flash memory and the logical address of the host. When the host transmits a trim command to invalidate a specific portion of the mapping table and the host manages to read the data of the specific portion, the flash memory controller sets up a flag to be open so that the data is transmitted to the host without the implement of the data processing module.

18 Claims, 7 Drawing Sheets

| H2F | Logical Address | Physical Address |
|---|---|---|
| | 1 | (BLK#,U#) |
| | ... | ... |
| | j | (BLK#,U#) |
| | (j+1) | (BLK#,U#) |
| | ... | ... |
| | 2j | (BLK#,U#) |
| | ... | ... |

Logical addresses 1 through j: H2F_H#1
Logical addresses (j+1) through 2j: H2F_H#2
...

FIG. 2

Trim Command

Trim Request #1: | H#5 | H#6 | H#7 |

Trim Request #2: | H#3 | H#4 | H#5 |

Trim Request #3: | H#6 | H#7 |

Trim Request #4: | H#3 | H#4 |

DATA STORAGE DEVICE AND METHOD FOR OPERATING DATA STORAGE DEVICE

CROSS REFERENCE TO RELATED APPLICATIONS

This Application claims priority of Taiwan Patent Application No. 106115909, filed on May 11, 2017, the entirety of which is incorporated by reference herein.

BACKGROUND OF THE INVENTION

Field of the Invention

The present invention relates to data storage devices, and in particular to space-trimming of non-volatile memory.

Description of the Related Art

There are various non-volatile memories used in data storage devices for long-term data storage, such as flash memory, magnetoresistive RAM, ferroelectric RAM, resistive RAM, spin transfer torque-RAM (STT-RAM), and so on.

The performance of a data storage device is limited due to the operational characteristics of non-volatile memory. How to enhance the performance of data storage devices is an important issue in this area of technology.

BRIEF SUMMARY OF THE INVENTION

An integrated trim technology is disclosed by the present invention. When the host manages to read invalid data which has been trimmed, the data storage device can transmit fixed and identical data to the host through different data transmission routes.

A data storage device includes a flash memory, a data processing module and a flash memory controller. Corresponding to the operation of a host, the flash memory controller arranges the flash memory to store data, and it stores a mapping table to record the mapping information between the flash memory and the logical address of the host. When the host transmits a trim command to invalidate a specific portion of the mapping table and the host manages to read the data of the specific portion, the flash memory controller sets up a flag to be open so that the data is transmitted to the host without the implement of the data processing module.

A method for operating a data storage device is provided. The data storage device includes a flash memory, a data processor and a flash memory controller. The method includes arranging the flash memory to store data under operation of a host; storing a mapping table to record mapping information between a logical address of the host and the flash memory; and when the host transmits a trim command to invalidate a specific portion of the mapping table and the host manages to read the data of the specific portion, setting up a flag to be open so that the data is transmitted to the host without the implement of the data processing module.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

There are various forms of non-volatile memory for long-term data retention, such as flash memory, magnetoresistive RAM, ferroelectric RAM, resistive RAM, spin transfer torque-RAM (STT-RAM) and so on. The following discussion uses flash memory in particular as an example.

Today, flash memory is usually used as a storage medium in a data storage device, such as a memory card, a universal serial bus (USB) flash device, a solid state disk (SSD, NVMe, M.2, U.2), and so on. In an exemplary embodiment, a flash memory and a controller may be wrapped together as a multi-chip package named eMMC.

A data storage device using a flash memory as a storage medium may be applied to a variety of electronic devices. The electronic device may be a smartphone, a wearable device, a tablet computer, a virtual reality device, etc. A central processing unit (CPU) in an electronic device may be regarded as a host that operates the connected data storage device.

Figure 1A:
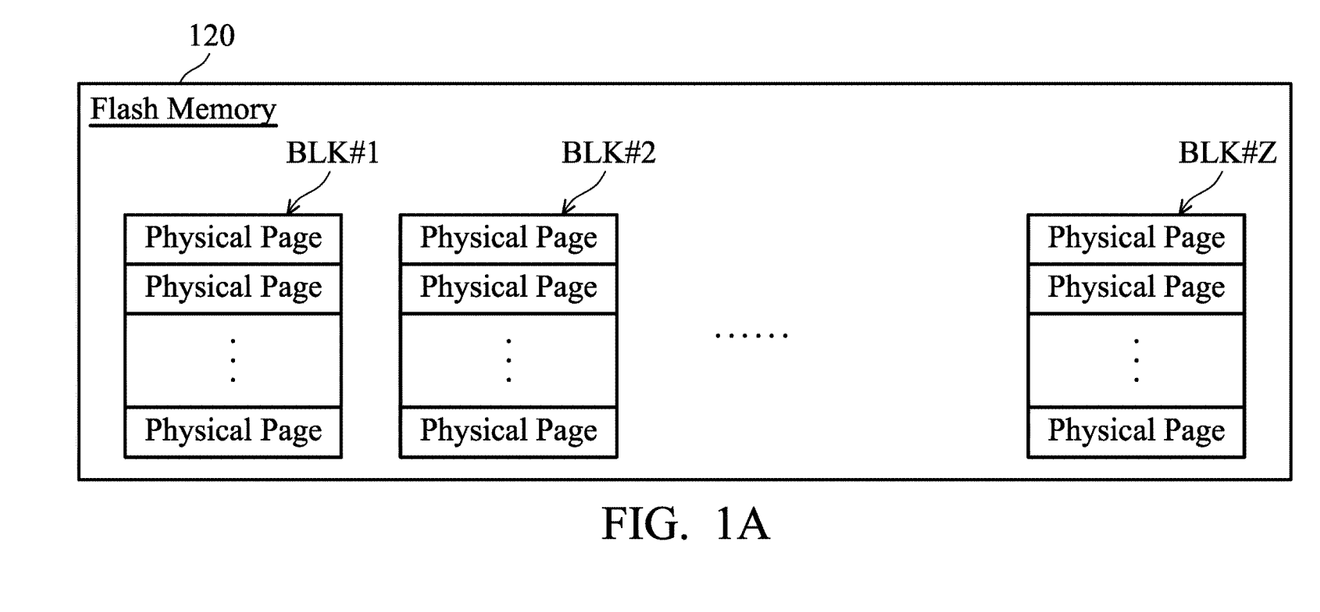
FIGS. 1A and 1B illustrate the physical space planning of a flash memory 120 in accordance with an embodiment of the disclosure.
Figure 1B:
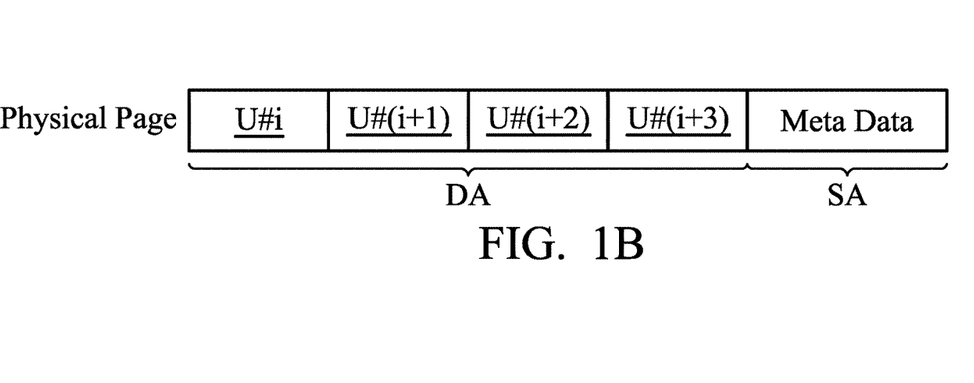

FIGS. 1A and 1B illustrate the physical space planning of a flash memory 120 in accordance with an embodiment of the disclosure. As shown in FIG. 1A, the storage space of the flash memory 120 is divided into a plurality of blocks (physical blocks) BLK#1, BLK#2 . . . BLK#Z, etc., where Z is a positive integer. Each physical block includes a plurality of physical pages, for example: 256 physical pages.

One physical page is further discussed in FIG. 1B. Each physical page includes a data area DA, and a spare area SA. The data area DA may be divided into a plurality of storage units U#i, U#(i+1), U#(i+2), and U#(i+3) to be separately allocated for data storage of the issued logical addresses. There are many forms of logical addresses can be related to the allocated storage units. For example, the allocated storage units may correspond to data storage of logical block addresses (LBAs) or global host pages (GHPs). In an exemplary embodiment, the data area DA is 16 KB and is divided into four 4 KB storage units U#i, U#(i+1), U#(i+2), and U#(i+3). Each 4 KB storage unit may be allocated to store data indicated by eight logical block addresses (e.g.

LBA#0 to LBA#7) or one GHP. The spare area SA is used to store metadata like the mapping information showing what logical addresses used at the host side that the data in the storage units U#i, U#(i+1), U#(i+2) and U#(i+3) corresponds to.

However, the mapping information recorded in the spare area SA is not always valid. The flash memory 120 has a special physical property: the updated data is not overwritten on the storage space of old data. Instead, the updated data is written to a free space and the old data in the original space is invalidated. A mapping table (e.g. a table H2F showing the mapping from logical addresses to physical space) has to be dynamically managed for the flash memory 120.

Figure 2:
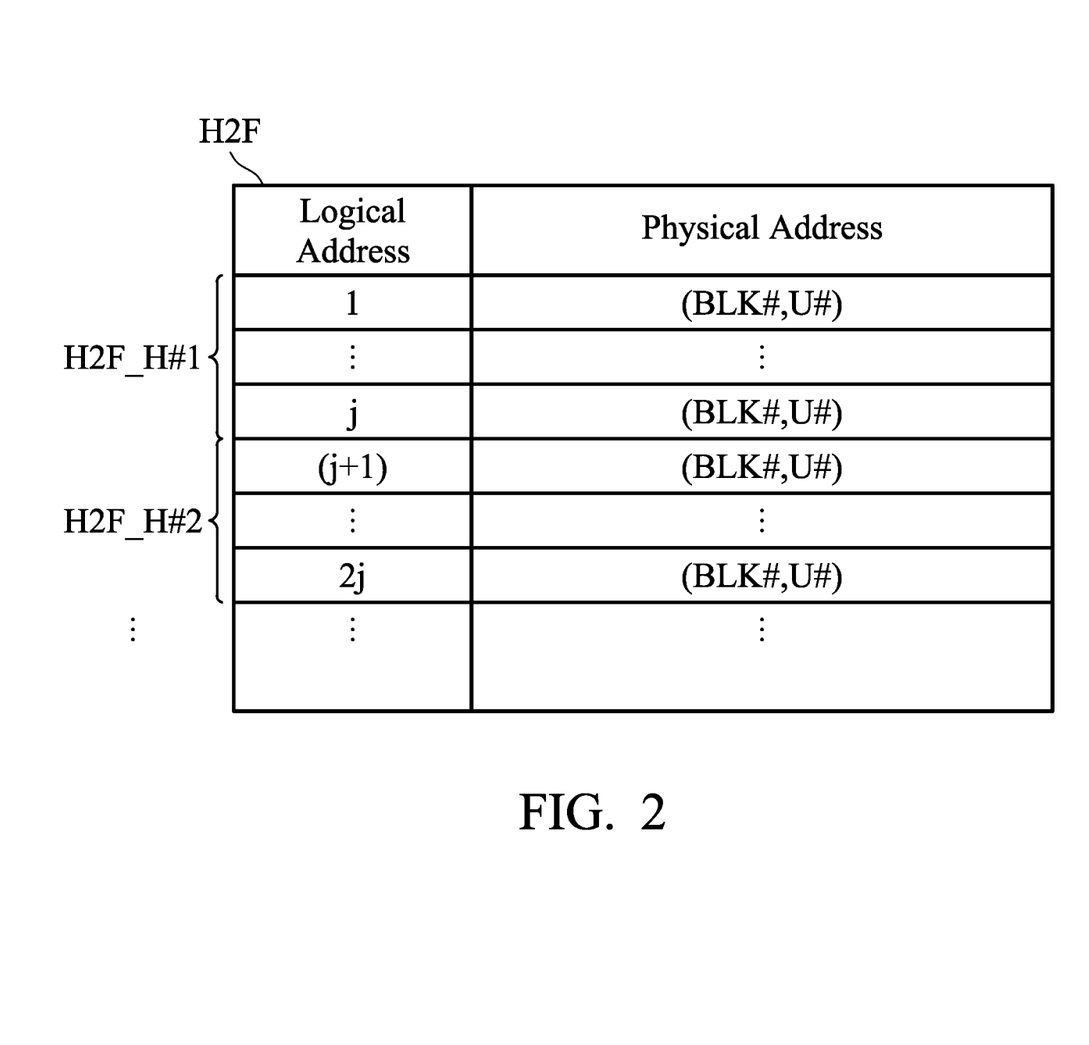
FIG. 2 depicts a mapping table H2F with the logical address (LBA or GHP) as the index.

FIG. 2 depicts a mapping table H2F with the logical address (LBA or GHP) as the index. In the mapping table H2F, how the storage space in the flash memory 120 is allocated for storing the data of the different logical addresses is shown. A block number BLK# and a storage unit number U# are presented to show the physical address that a logical address maps to. For a huge storage space, the mapping table H2F may be further divided into host block-mapping tables H2F_H#1, H2F_H#2 . . . H2F_H#Z corresponding to host blocks H#1, H#2 . . . H#Z, where Z is an integer number.

In an exemplary embodiment, each host block-mapping table is 64 KB (recorded in four consecutive physical pages) to show mapping information of 8K of data. One host block-mapping table may correspond to a section of logical addresses, like GPH#0 . . . #8191, GPH#8192 . . . #16383, GPH#16384 . . . #24575, GPH#24576 . . . #32767, or GPH#32768 . . . #40959, and so on. After being updated, the host block-mapping tables H2F_H#1, H2F_H#2 . . . H2F_H#Z may be stored in a specific physical block (e.g. a system block). In order to speed up the reading of the host block-mapping tables H2F_H#1, H2F_H#2 . . . H2F_H#Z, a list of indicators or a high-level mapping table may be provided to show where the different host block-mapping tables H2F_H#1, H2F_H#2 . . . H2F_H#Z are stored in the system block. The flash memory 120 is operated according to the mapping table H2F.

The trim command is utilized to enhance the performance of the data storage device and complies with the operating feature of the flash memory 120. The host can issue a trimming command to the data storage device to inform that one or some logical addresses (the target logical address) could be removed (which means that the data of the target logical address is no longer invalid). Accordingly, in the data storage device, the records of one or some logical addresses may be removed or amended from the mapping table H2F. Afterwards, the physical space with only invalid data remaining from the target logical address may be recycled or reused by a garbage collection.

Figure 3:
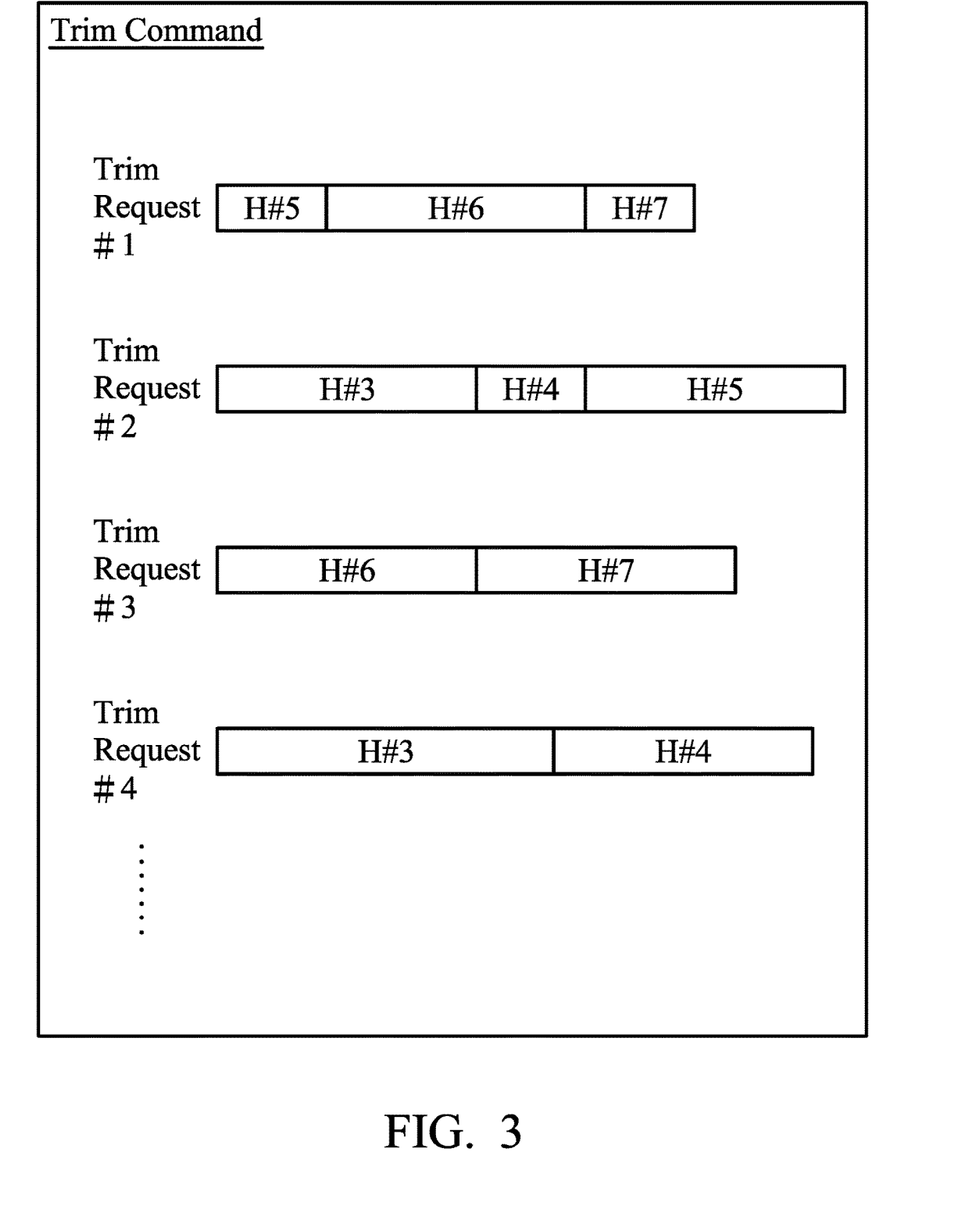
FIG. 3 is provided for discussion of a trimming command.

FIG. 3 is provided for discussion of a trimming command. There may be up to 500 trimming requests issued in one trimming command. Referring to FIG. 3, host blocks involved in the trimming requests are listed here in sequence: H#5, H#6, H#7, H#3, H#4, H#5, H#6, H#7, H#3, H#4. Each trimming request may indicate at least one logical address section to be trimmed by data length and the starting logical address, or by the starting and ending logical addresses. In the mapping table H2F, the mapping information that indicates the logical address sections may be removed, or the physical addresses corresponding to the logical addresses could be changed to a predefined value, e.g. 0xFFFF or 0x0000 in order to interrupt or remove the mapping from all logical addresses in the above logical address section to the flash memory 120.

Figure 4A:
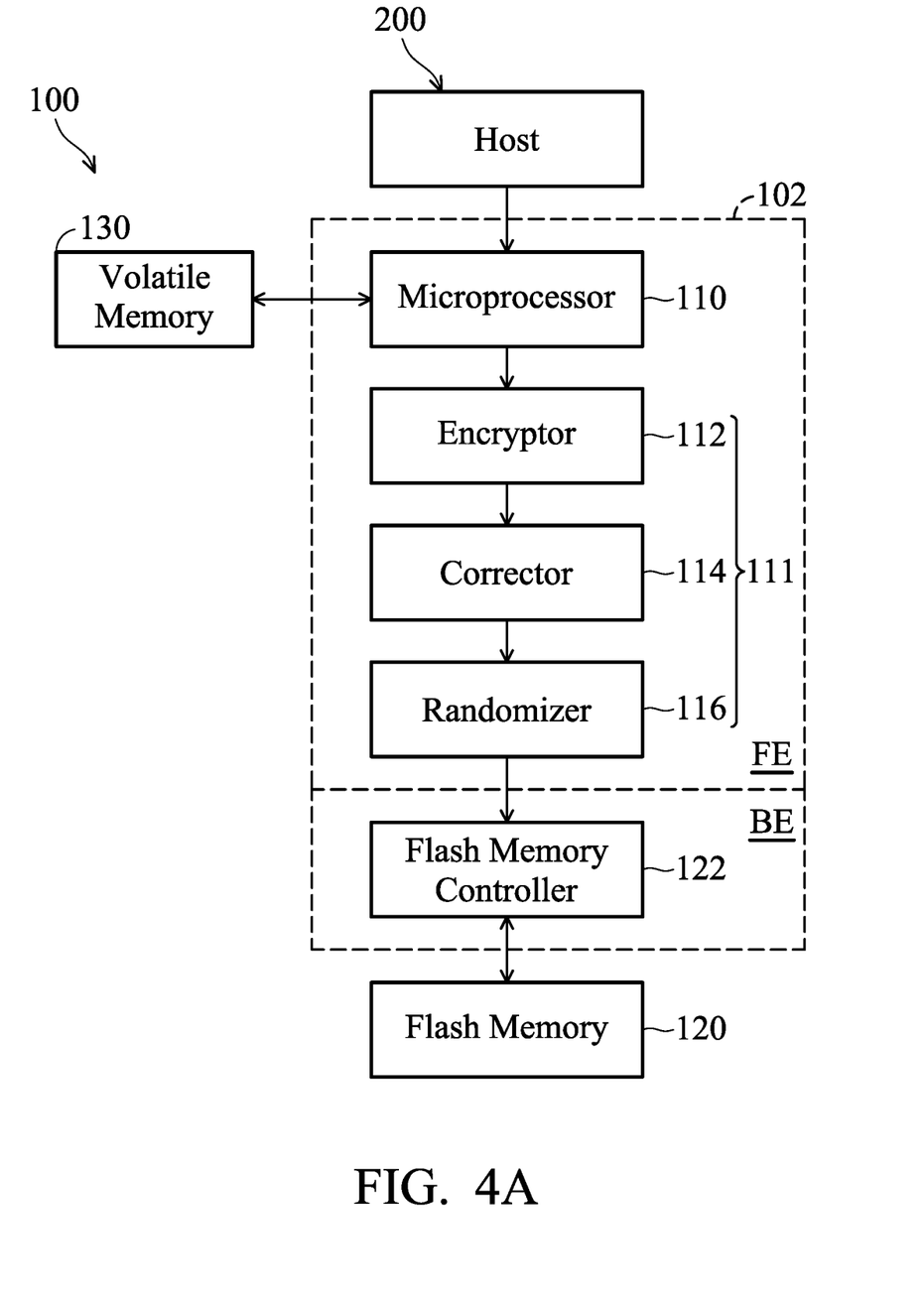
FIG. 4A is a block diagram depicting a data storage device 100 in accordance with an exemplary embodiment of the disclosure.

FIG. 4A is a block diagram depicting a data storage device 100 in accordance with an exemplary embodiment of the disclosure. The data storage device 100 includes a controller 102, a flash memory 120 and a volatile memory 130. The controller 102 includes a microprocessor 110, a data processing module 111, a flash memory controller 122. The data processing modules 111 includes an encryptor 112, a corrector 114 and a randomizer 116. Specifically, the microprocessor 110, the encryptor 112, the corrector 114 and the randomizer 116 are arranged on the front end FE of the controller 102. The flash memory controller 122 is arranged on the back end BE of the controller 102.

The front end FE is responsible for communication between the data storage device 100 and a host 200. The back end BE is responsible for operating the flash memory 120 so that the host 200 can write or read data for the flash memory 120. According to such a two-layer control structure, the communication between the host 200 and the data storage device 100 is specifically managed at the front end FE. Thus, the throughput between the host 200 and the data storage device 100 is considerably improved. The complexity of debugging is also reduced, no matter whether it is at the front end FE or at the back end BE.

In addition, the host 200 is connected to the data storage device 100A via a bus interface. The commands that comply with the NVMe standard (referred to as external commands in the following descriptions) which are issued from the host 200 are transmitted to the microprocessor 110 to be scheduled and then transmitted to the back end BE. In other words, the microprocessor 110 communicates with the host 200 through the bus interface, and the communication between the data storage device 100 and the host 200 can be simplified. The external commands are scheduled by the microprocessor 110 according to the sequence of setting or receiving priorities. In one embodiment, the microprocessor 110 may support an NVMe command protocol, an ATA (advanced technology attachment) command protocol, a PATA (parallel ATA) command protocol, a SATA (serial ATA) command protocol, a SCSI (small computer system interface), an eMMC or UFS.

The process for writing data is that the microprocessor 110 transmits the data 10 through the data processing module 111 to the flash memory controller 122. Specifically, the encryptor 112 of the data processing module 111 executes encryptions for the data 10. For example, the above encryption includes the Advanced Encryption Standard (AES) or the RSA encryption. Afterwards, the corrector 114 generates an additional correction code based on the encrypted data 10 for providing protections on the accuracy of the data 10. The above correction includes the CRC correction or the ECC correction. Furthermore, the data 10 with the correction code is scattered by the randomizer 116 so that the distribution of value (i.e., 0 or 1) of the randomized data 10 is more average than before. Afterwards, the randomizer 116 transmits the randomized data 10 to the flash memory controller 122. Finally, the flash memory controller 120 writes the randomized data 10 to the flash memory 120, and stores the logical address and physical address of the randomized data 10 to the mapping table H2F or the host block mapping table H2F_H. On the contrary, the processing for reading data is that the flash memory controller 122 transmits data 10 through the data processing module 111 to the microprocessor 110.

In one embodiment, the mapping table H2F could be stored by the flash memory controller 122. The trim command could be transmitted by the host to the data storage device 100 for indicating the removal of one or several target logical addresses. Afterwards, the one or several target logical addresses are removed from the mapping table H2F or the target physical address corresponding to target logical address is amended to be a specific value (such as 0xFFFF) by the flash memory controller 122 of the data storage device 100 directly or indirectly to complete the execution of the trim command. The mapping table H2F could be updated dynamically corresponding to the trim command of the host 200.

Figure 4B:
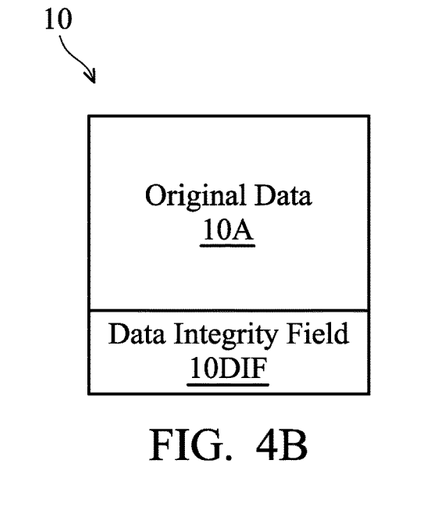
FIG. 4B is a block diagram depicting data in accordance with an exemplary embodiment of the disclosure.

FIG. 4B is a block diagram depicting data 10 in accordance with an exemplary embodiment of the disclosure. As shown in the figure, the data 10 includes the original data 10A and a data integrity field (DIF) 10DIF. The data integrity field 10DIF is related to the original data 10A and protects the original data 10A. The data integrity field 10DIF could be inserted into the front end or the back end of the original data 10A, which is not limited by the present invention.

Figure 4C:
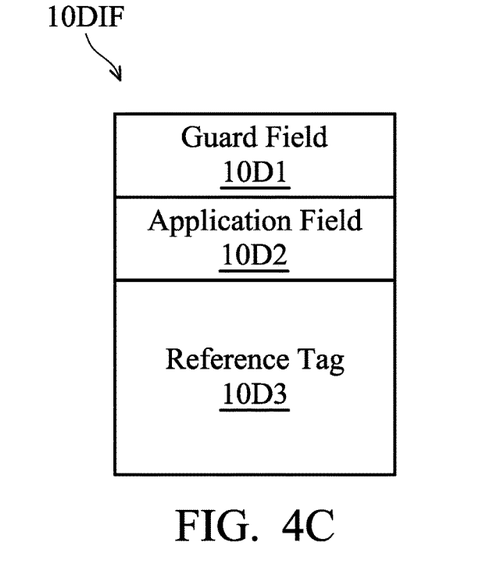
FIG. 4C is a block diagram depicting data in accordance with an exemplary embodiment of the disclosure.

FIG. 4C is a block diagram depicting a data integrity field 10DIF in accordance with an exemplary embodiment of the disclosure. The data integrity field 10DIF includes a guard field 10D1, an application field 10D2 and a reference tag 10D3. In one embodiment, the size of data integrity field 10DIF is 8 bytes. the guard field 10D1 is 2 bytes, the application field 10D2 is 2 bytes, and the reference tag 10D3 is 4 bytes.

Figure 5:
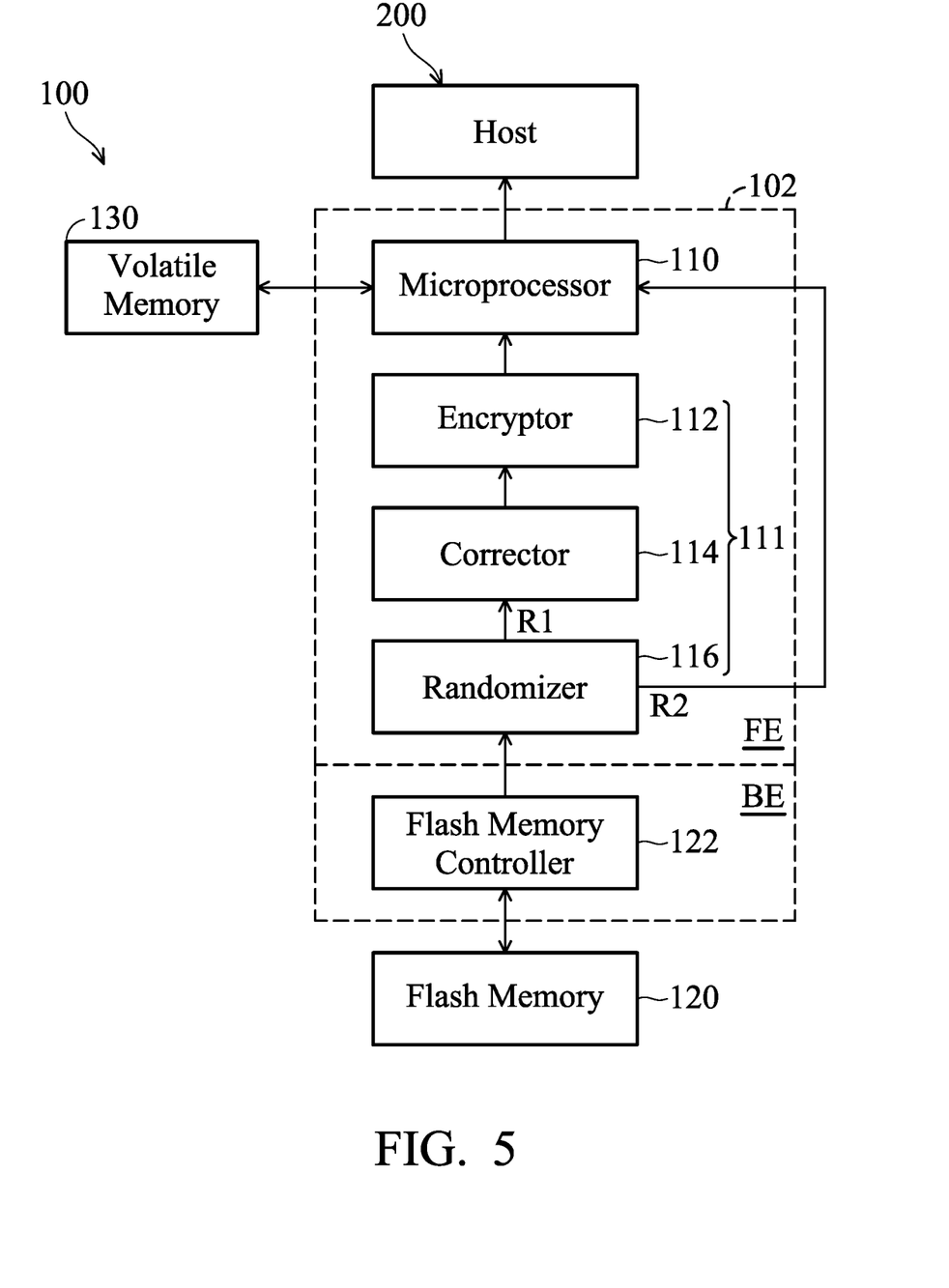
FIG. 5 is a block diagram depicting a data storage device 100 in accordance with an exemplary embodiment of the disclosure.

FIG. 5 is a block diagram depicting a data storage device 100 in accordance with an exemplary embodiment of the disclosure. The embodiment illustrates the data processing procedure of the data storage device 100 to respond the data reading command of the host 200. The data 10 or data 10' is generated from the data processing procedure. The main difference between the data 10 and data 10' is that the last bit (i.e., the 15th bit) of the guard field 10D could be set to be a flag. The setting of flag is merely for illustration, not for limitation. For example, the flag could be set in other bits of the guard field 10D1, or set in a certain bit of the application field 10D2 or the reference tag 10D3. The mapping table H2F or the host block mapping table H2F_H is established and maintained by the flash memory controller 122 of the data storage device 100. In addition, two different data processing procedures are developed in order to respond the data reading command of the host 200.

In the embodiment of FIG. 5, when a trim command is transmitted from the host 200 to the data storage device 100 to remove a target logical address, such as LBA#1000, the mapping information of LBA#1000 of the mapping table H2F or the host block mapping table H2F_H is removed or amended by the flash memory controller 122. Afterwards, when the data reading command including the target logical address is transmitted by the host 200 to the data storage device 100, the target logical address does not exist in the mapping table H2F or the host block mapping table H2F_H, or the target physical address corresponding to the target logical address is a specific value. Therefore, the flash memory controller 122 generates the data 10', and provides a predetermined value for the original data 10A of the data 10', such as 0x0000 or 0xFFFF. In addition, the guard field 10D1 of the data integrity field 10DIF is set to be open, and the data 10' is transmitted to the randomizer 116. When the randomizer 116 receives the data 10', it determines whether the flag of the guard field 10D1 is open or not. If it is open, the randomizer 116 does not perform anti-random processing for the data 10' and transmits the data 10' to the microprocessor 110. The data processing procedure is labeled R2. Furthermore, the flash memory controller 122 can set all portions other than the flag to be 0 or 1. In summary, when the target logical address which is accessed by the host 200 has been removed from the mapping table H2F or the host block mapping table H2F_H, or the target physical address corresponding to the target logical address which is going to be accessed has been amended to be a specific value, the randomizer 116 determines whether the flag is set to be open or not. If yes, the route R2 is selected to transmit the data 10' to the microprocessor 110. If not, the route R1 is selected to transmit the data 10 to the microprocessor 110. The difference between the routes R1 and R2 is that the route R2 does not pass through the data processing module 111 but directly connects to the microprocessor 110, and the route R1 passes through the data processing module 111 and connects to the microprocessor 110.

In addition, the flag is the last bit of the guard field 10D1. When the flag is 1, it means that it is open. When the flag is 0, it means that it is closed. In other embodiments, when the flag is 0, it means that it is open. When the flag is 1, it means that it is closed, which is not limited by the present invention. In one embodiment, when the target logical address which is accessed by the host 200 has been removed from the mapping table H2F or the host block mapping table H2F_H, or the target physical address corresponding to the target logical address which is going to be accessed has been amended to be a specific value, the flash memory controller 122 sets the flag to be 1, and sets all portions other than the flag to be 0. In other embodiments, all portions other than the flag are set to be 1, which is not limited by the present invention.

Because the flag is set to be 1, the data 10' is directly transmitted to the microprocessor 110 through the route R2. Afterwards, the microprocessor 110 can release the setting of the flag, and can transmit the data 10' which flag has been released to the host 200. Therefore, the data 10' received by the host 200 is a predetermined value. By utilizing the data processing method of the present invention, whenever the target logical address which is accessed by the host 200 has been removed from the mapping table H2F or the host block mapping table H2F_H, or the target physical address corresponding to the target logical address which is going to be accessed has been amended to be a specific value, the data storage device 100 transmits the predetermined value to the host 200 in order to meet the standard of the deterministic trim (DRAT).

If the target logical address which is going to be accessed by the host 200 is on the mapping table H2F or the host block mapping table H2F_H and the target physical address is not specific value, the flash memory controller 122 reads the target physical address corresponding to the target logical address to obtain the data 10 and transmits the data 10 to the randomizer 116. The randomizer 116 transmits the data 10 through the route R1 so that the data 10 is implemented by the data processing module 111 and transmitted to the microprocessor 110 and the host 200. If the data 10' is also transmitted to the microprocessor 110 through the route R1, the content of the data 10' becomes meaningless value after it is implemented by the data processing module 111, and error might occur on the host 200. Therefore, the present invention provides a data splitting processing method (through two different routes R1 and R2) so that the data storage device 100 complies with the standard of deterministic trim (DRAT). Accordingly, an optimal and economic solution is provided without changing the original data processing flow (the route R1).

Specifically, the randomizer 116 of the data storage device 100 determines whether the flag of the data from the flash memory controller 122 is open or closed. When the randomizer 116 determines that the flag is open, the route R2 will be adopted so that the data 10' will not be implemented by the randomizer 116, the corrector 114 and the encryptor 113. When the randomizer 116 determines that the flag is closed, the route R1 will be adopted so that the data 10' will be implemented by the randomizer 116, the corrector 114 and the encryptor 113. In other embodiments, whether the flag is open or closed could also be determined by the flash memory controller 122, which is not limited by the present invention.

Figure 6:
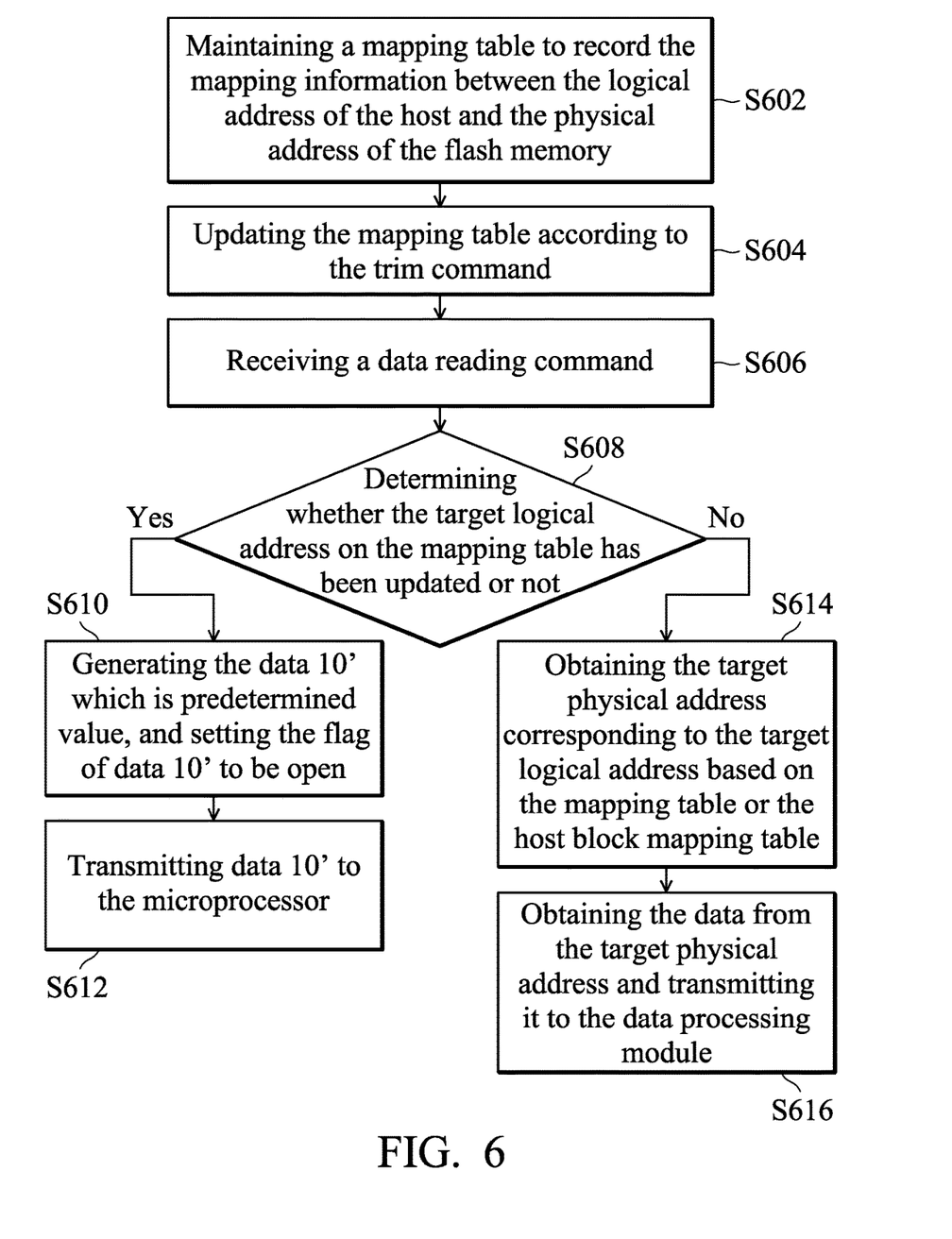
FIG. 6 is a flow chart depicting storage-space trimming in accordance with an exemplary embodiment of the disclosure.

FIG. 6 is a flow chart depicting a data processing method in accordance with an exemplary embodiment of the disclosure. In step S602, the flash memory controller 122 maintains a mapping table H2F to record the mapping information between the logical address of the host 200 and the physical address of the flash memory 120. The mapping table H2F could be divided into a plurality of host block mapping tables H2F_H. The mapping table H2F or several host block mapping tables H2F_H could be temporarily stored in the volatile memory 130. In step S604, the mapping table H2F is updated by the flash memory controller 122 according to the trim command. The updating means canceling or amending the record of the mapping table H2F or the host block mapping table H2F_H. In step S606, a data reading command is received which includes a target logical address, such as LBA#1000. Afterwards, in step S608, the flash memory controller 122 determines whether the target logical address on the mapping table H2F has been updated or not.

If the result is yes, step S610 will be executed. The flash memory controller 122 generates the data 10', the data 10' is predetermined value, and the flag of data 10' is set to be open. Afterwards, in step S612, the data 10' is transmitted to the microprocessor 110. If the result is not, step S614 will be executed. The flash memory controller 122 obtains the target physical address corresponding to the target logical address based on the mapping table H2F or the host block mapping table H2F_H. Afterwards, in step S616, the data 10 is obtained from the target physical address and transmitted to the data processing module 111.

Other techniques that use the aforementioned concepts to integrate space-trimming are within the scope of the disclosure. Based on the above contents, the present invention further relates to methods for operating a data storage device.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a flash memory;
a data processing module; and
a flash memory controller, under operation of a host, arranging the flash memory to store data, and storing a mapping table to record mapping information between logical addresses and physical addresses of the data in the flash memory,
wherein:
when the host transmits a trim command to invalidate a specific portion of the mapping table first and the host reads data corresponding to the specific portion, the flash memory controller sets up a flag to be open so that the data corresponding to the specific portion is transmitted to the host without process of the data processing module, wherein the data corresponding to the specific portion comprises original data and a data integrity field (DIF) for protecting the original data, wherein the data integrity field comprises a guard field, an application field and a reference tag.

2. The data storage device as claimed in claim 1, wherein: the flag is the last bit of the guard field.

3. The data storage device as claimed in claim 1, wherein: the flag is a portion of a field, when the host manages to read the data corresponding to the specific portion, the flash memory controller sets up the flag to be open, and sets up another portion of the field other than the flag to be 0 or 1, to comply with a standard of deterministic trim (DRAT).

4. The data storage device as claimed in claim 1, wherein: the data processing module comprises a randomizer which is coupled to the flash memory controller to scatter the stored data so that voltage of the data is distributed uniformly.

5. The data storage device as claimed in claim 4, wherein: the data processing module comprises a corrector which is coupled to the randomizer to correct the stored data.

6. The data storage device as claimed in claim 5, wherein: the data processing module comprises an encryptor which is coupled to the corrector to encrypt the stored data.

7. The data storage device as claimed in claim 6, wherein: the data processing module comprises a microprocessor which is coupled to the host to receive a command from the host and provides data transmission between the host and the data storage device.

8. The data storage device as claimed in claim 7, wherein: the randomizer is further utilized to determine whether a flag of data from the flash memory controller is open or closed, wherein:
when the flag of the data from the flash memory is open, the data from the flash memory is not processed by the randomizer, the corrector and the encryptor, and the data from the flash memory is directly transmitted to the microprocessor by the flash memory controller; and
when the flag of the data from the flash memory is closed, the data from the flash memory is processed by the randomizer, the corrector and the encryptor.

9. The data storage device as claimed in claim 8, wherein: the flag of the data from the flash memory is a portion of a field, when the flag of the data from the flash memory is open, after the data from the flash memory is received by the microprocessor, the microprocessor sets up the flag of the data from the flash memory to be closed so that the field is 0 or 1 entirely, and adjusted data is transmitted to the host.

10. A method for operating a data storage device which comprises a flash memory, a data processing module and a flash memory controller, the method comprising:
arranging the flash memory to store data under operation of a host;
storing a mapping table to record mapping information between logical addresses and physical addresses of the data in the flash memory; and
when the host transmits a trim command to invalidate a specific portion of the mapping table and the host reads data corresponding to the specific portion, setting up a flag to be open so that the data corresponding to the specific portion is transmitted to the host without process of the data processing module, wherein the data corresponding to the specific portion comprises original data and a data integrity field (DIF) for protecting the original data, wherein the data integrity field comprises a guard field, an application field and a reference tag.

11. The method for operating the data storage device as claimed in claim 10, wherein:
the flag is the last bit of the guard field.

12. The method for operating the data storage device as claimed in claim 10, wherein the flag is a portion of a field, and the data storage device further comprising:
when the host manages to read the data corresponding to the specific portion, setting up the flag to be open, and setting up another portion of the field other than the flag to be 0 or 1, to comply with standard of deterministic trim (DRAT).

13. The method for operating the data storage device as claimed in claim 10, further comprising:
scattering the stored data so that voltage of the data is distributed uniformly by a randomizer of the data processing module.

14. The method for operating the data storage device as claimed in claim 13, further comprising:
correcting the stored data by a corrector of the data processing module.

15. The method for operating the data storage device as claimed in claim 14, wherein:
encrypting the stored data by an encryptor of the data processing module.

16. The method for operating the data storage device as claimed in claim 15, wherein:
by utilizing a microprocessor of the data processing module, receiving a command from the host and implementing providing data transmission between the host and the data storage device.

17. The method for operating the data storage device as claimed in claim 16, further comprising:
determining whether a flag of data from the flash memory controller is open or closed by the randomizer, wherein:
when the flag of the data from the flash memory is open, the data from the flash memory is not processed by the randomizer, the corrector and the encryptor, and the data from the flash memory is directly transmitted to the microprocessor by the flash memory controller; and
when the flag of the data from the flash memory is closed, the data from the flash memory is processed by the randomizer, the corrector and the encryptor.

18. The method for operating the data storage device as claimed in claim 17, wherein:
the flag of the data from the flash memory is a portion of a field, when the flag of the data from the flash memory is open, after the data from the flash memory is received by the microprocessor, setting up the flag of the data from the flash memory to be closed so that the field is 0 or 1 entirely by the microprocessor, and transmitting adjusted data to the host.

* * * * *